Patented Mar. 20, 1934

1,951,354

UNITED STATES PATENT OFFICE 1,951,354

COLLOIDAL HALIDE AND PROCESS OF MAKING THE SAME

Ernest Govett, deceased, late of New York, N. Y., by Ernest H. Govett and Agnes H. Govett, executors, New York, N. Y.; said Ernest Govett assignor to Govett, Ltd., New York, N. Y., a corporation of New York No Drawing. Original application March 20, 1928, Serial No. 263,211, now Patent No. 1,810,104, dated June 16, 1931. Divided and this application March 14, 1931, Serial No. 522,777. In France March 15, 1929

6 Claims. (Cl. 23—89)

The invention which forms the subject of the present application (a division of the copending application of Ernest Govett, deceased, Serial No. 263,211, filed March 20, 1928, now Patent 1,810,104, relates to alkali metal halides, especially iodides, and its chief object is to provide a colloidal form of such salts capable of making a homogeneous solution in water. Another object is to provide a convenient and effective process of making such salts. Other objects will appear from the following detailed description of the preferred way of carrying out the invention.

In the preferred practice of the process as applied, for example, to the production of sodium iodide, aqueously dispersed or colloidal hydrogen iodide (hydriodic acid, HI) is first formed by reaction of iodine, which may be the ordinary commercial form of the element, with an organic acid in an aqueous medium. The acids which may be used for the purpose are such as have, or will behave as if they had, an "odd" or "loose" atom of hydrogen, as for example tannic and gallic acids. In using tannic acid the solution may contain not more than about 150 grams of the acid per liter and the iodine may be slightly less than enough to satisfy what apparently would be the reaction if, as stated, tannic acid had an odd or loose atom of hydrogen, namely,

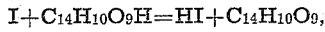

or, possibly,

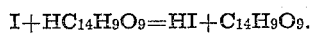

The colloidal solution may be warmed to hasten the reaction, but the temperature should be kept below the point at which iodine vapors are given off. To this solution an alkali metal hydroxide is added, preferably KOH. In the presence of the hydrogen iodide (HI) the tannin (or tannic acid decomposition product of the reaction of the iodine and the tannic acid) reacts with the potassium hydroxide, forming insoluble potassium tannate or a compound in the nature of a tannate. Having thrown out the tannin as potassium tannate enough potassium or sodium hydroxide is added to neutralize the HI present, thus forming potassium or sodium iodide, as the case may be, dispersed in water. The latter is evaporated to dryness and heated to a temperature (210° to 215° C.) which will decompose the residual tannin, if any, without decomposing the iodide. The carbon of the tannin goes off apparently as $CO_2$, for the black iodide thus obtained contains at most only a trace of carbon and hence its color can not be attributed to the presence of the latter element.

When using gallic acid in the first step the procedure is the same way as with tannic acid except that the gallic acid is dissolved in hot water, and the solution is cooled down to about 35° C. before adding the iodine. The latter should be added in such amount that the quantity dispersed therein does not exceed about 35 grams per liter, and the amount of acid in solution should be about 8 per cent in excess of what would be enough to satisfy such an equation as

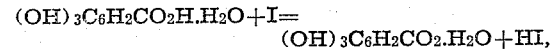

assuming gallic acid to have the composition stated therein. Throughout the process the aqueous dispersions are kept warm but below the temperature at which iodine vapors appear.

Colloidal alkali metal bromides may be produced in a similar manner, that is, first forming colloidal hydrogen bromide dispersed in water, and converting the latter into the desired salt by reaction with the appropriate hydroxide. Or, in making colloidal alkali metal iodides or bromides, a colloidal form of the halogen is first produced, and any known method is then followed (using the colloidal halogen) for making the halide with the ordinary halogen, remembering that with colloidal iodine or bromine heat may have to be used in some cases to bring about the desired reaction. A process of preparing colloidal iodine is described and claimed in the aforesaid copending application of Ernest Govett, Serial No. 263,211, now Patent No. 1,810,104, issued June 16, 1931, and a process of preparing colloidal bromine is described and claimed in copending application Serial No. 522,779, filed of even date herewith.

The expression "aqueous dispersion" as used herein includes true solutions and colloidal solutions.

Similarly, the expression "dispersed" as used herein includes dispersions where the largest aggregate of the dispersed phase is the chemical molecule or the colloidal particle.

Further, the expression "colloidal alkali metal halides" signifies alkali metal halides which are abnormal due to their black color and are adapted to be dispersed in water either colloidally or molecularly. Since the normal alkali metal halides are white colored and readily soluble in water in the true sense of the term, it is reasonable to assume that the products described herein may be colloidal in the true sense of the term, but since it is not definitely known, the above definition of "colloidal alkali metal halides" is given to insure strict accordance with known facts.

In accordance with the statutes we have described the invention of Ernest Govett, deceased, in such detail as will enable others, skilled in the art to which it appertains or to which it is most nearly related, to practice the invention, and we have also stated what we believe to be a correct scientific theory, but we desire it to be understood that we do not consider the invention limited to such theory or to the details referred to.

The colloidal halides produced according to the present invention form a black or brownish black sticky, gluey residue when the water in which it is dispersed or dissolved is evaporated, becoming brittle when heated to dryness and again becoming sticky and gluey when wetted. The iodides have the therapeutic and physiological effects of elemental iodine without the caustic, irritating, toxic and systemic depressing effects of the latter and as being capable of internal administration in doses, adapted to give a maximum desired therapeutic reaction without the skin eruption or other characteristics of iodism.

What is claimed as the invention of the said Ernest Govett is:

1. In a process of making colloidal alkali metal halides, the steps comprising causing the halogen to react with a carboxylic acid whereby a hydrogen halogen compound is produced in aqueous dispersion, causing the latter to react with an alkali metal hydroxide and evaporating the aqueous medium.

2. In a process of producing a colloidal alkali metal halide, the steps of reacting a halide with one of the group consisting of tannic and gallic acids in water whereby a hydrogen halogen compound is dispersed in water, adding an alkali metal hydroxide whereby a precipitate is formed, removing the precipitate by filtration, neutralizing the filtrate with an alkali metal hydroxide and evaporating the water.

3. In a process of producing colloidal sodium iodide, the steps of reacting iodine with tannic acid in water, whereby a sodium iodine compound is produced dispersed in water, adding potassium hydroxide whereby a precipitate is formed, removing the precipitate by filtration, neutralizing the filtrate with sodium hydroxide and evaporating the water.

4. As a new product, an alkali metal halide which is substantially identical with that produced by reacting a halogen with one of the group consisting of tannic and gallic acids in water, adding an alkali metal hydroxide, removing the precipitate by filtration, neutralizing the filtrate by means of an alkali metal hydroxide and evaporating the water.

5. As a new product a sodium iodine compound which is substantially identical with that produced by reacting iodine with one of the group consisting of tannic and gallic acids in water, adding potassium hydroxide, removing the precipitate by filtration, neutralizing the filtrate by means of sodium hydroxide and evaporating the water.

6. As a new product, a colloidal alkali iodide dispersible in water to form a black or brownish black sticky gluey residue when the water is evaporated, becoming brittle when heated to dryness and again becoming sticky and gluey when wetted, and having the therapeutic and physiological effects of elemental iodine without the caustic, irritating, toxic, and systemic depressing effect of the latter and being capable of internal administration to patients to give a maximum desired therapeutic reaction without the skin eruptions and unfavorable reactions of iodism.

ERNEST H. GOVETT,
AGNES H. GOVETT,
Executors of the Estate of Ernest Govett, Deceased.